United States Patent
Wrona et al.

(10) Patent No.: US 12,024,198 B2
(45) Date of Patent: Jul. 2, 2024

(54) METHOD AND SYSTEM OF COLLECTING TRAINING DATA SUITABLE FOR TRAINING AN AUTONOMOUS DRIVING SYSTEM OF A VEHICLE

(71) Applicant: Aptiv Technologies AG, Schaffhausen (CH)

(72) Inventors: Tomasz Wrona, Cracow (PL);
Wojciech Turlej, Cracow (PL);
Nikodem Pankiewicz, Cracow (PL);
Mateusz Orlowski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 66 days.

(21) Appl. No.: 17/393,180

(22) Filed: Aug. 3, 2021

(65) Prior Publication Data

US 2022/0041182 A1 Feb. 10, 2022

(30) Foreign Application Priority Data

Aug. 4, 2020 (EP) .................................. 20189455

(51) Int. Cl.
*B60W 60/00* (2020.01)
*B60W 40/06* (2012.01)
(Continued)

(52) U.S. Cl.
CPC ........ *B60W 60/0013* (2020.02); *B60W 40/06* (2013.01); *B60W 40/08* (2013.01);
(Continued)

(58) Field of Classification Search
CPC .. B60W 60/0013; B60W 40/06; B60W 40/08; B60W 50/06; B60W 2540/00;
(Continued)

(56) References Cited

U.S. PATENT DOCUMENTS 11,514,363 B2 * 11/2022 Lewis .................... G06Q 10/04
11,548,518 B2 * 1/2023 Omari .................. G05D 1/0221
(Continued)

OTHER PUBLICATIONS

"Exteded European Search Report", EP Application No. 20189455.7, dated Jan. 29, 2021, 11 pages.
(Continued)

*Primary Examiner* — Mohamed Abdo Algehaim
(74) *Attorney, Agent, or Firm* — Harness, Dickey & Pierce, P.L.C.

(57) ABSTRACT

The present disclosure enables a collection of training data suitable for training an autonomous driving system of a vehicle. A database is provided that stores predefined road scenarios, and user devices are provided with a simulation game for controlling a vehicle agent in a road scenario. A plurality of user devices, running the simulation game, play a road scenario from the database to control a vehicle agent in the simulation game with steering actions entered by individual users, which generates a human demonstration of each road scenario that is played. Several human demonstrations played on the plurality of user devices can be maintained by a demonstration database and made available as training data suitable for training an autonomous driving system of a vehicle. A large amount of training data can be automatically generated, without requiring expensive or time-consuming real-world tests to generate suitable training data manually.

20 Claims, 2 Drawing Sheets

(51) Int. Cl.
*B60W 40/08* (2012.01)
*B60W 50/06* (2006.01)
*G05B 13/02* (2006.01)

(52) U.S. Cl.
CPC ......... *B60W 50/06* (2013.01); *G05B 13/0265* (2013.01); *B60W 2540/00* (2013.01)

(58) Field of Classification Search
CPC ................ B60W 40/00–2040/1392; B60W 10/00–2900/00; G05B 13/0265; G06Q 10/06; G06F 18/214; G06N 3/006; G06N 20/00
USPC .......................................................... 701/23
See application file for complete search history.

(56) References Cited

U.S. PATENT DOCUMENTS

| | | | |
|---|---|---|---|
| 11,794,676 B1* | 10/2023 | Benqassmi | B60W 10/00 |
| 2007/0077541 A1* | 4/2007 | Champagne | A63F 13/42 434/62 |
| 2009/0015684 A1* | 1/2009 | Ooga | G08G 1/0175 348/222.1 |
| 2015/0274176 A1* | 10/2015 | Mino | B60K 37/06 701/36 |
| 2017/0158193 A1* | 6/2017 | Lopez | B60W 30/18154 |
| 2017/0270236 A1* | 9/2017 | Yamaura | G06F 30/20 |
| 2017/0301260 A1* | 10/2017 | Gussen | G09B 5/06 |
| 2018/0025291 A1* | 1/2018 | Dey | G06N 20/00 706/11 |
| 2018/0089563 A1* | 3/2018 | Redding | G06N 5/01 |
| 2018/0120843 A1* | 5/2018 | Berntorp | G06N 3/08 |
| 2018/0284763 A1* | 10/2018 | Hernandez Sanchez | G08G 1/166 |
| 2018/0286268 A1* | 10/2018 | Ni | G02B 27/017 |
| 2019/0047584 A1* | 2/2019 | Donnelly | B60W 30/025 |
| 2019/0050520 A1* | 2/2019 | Alvarez | G06F 30/20 |
| 2019/0129831 A1* | 5/2019 | Goldberg | G06F 3/04847 |
| 2019/0168772 A1* | 6/2019 | Emura | B60K 35/00 |
| 2019/0196465 A1* | 6/2019 | Hummelshøj | G06V 20/56 |
| 2019/0303759 A1* | 10/2019 | Farabet | G06N 3/063 |
| 2019/0310624 A1* | 10/2019 | Bettger | B60W 50/14 |
| 2019/0318267 A1* | 10/2019 | Zhang | G06N 20/00 |
| 2020/0004255 A1* | 1/2020 | Mohammadiha | B60W 50/04 |
| 2020/0033869 A1* | 1/2020 | Palanisamy | G06N 5/043 |
| 2020/0074266 A1* | 3/2020 | Peake | G06F 18/2411 |
| 2020/0150654 A1* | 5/2020 | Isele | G05D 1/0248 |
| 2020/0225668 A1* | 7/2020 | Masuda | G05D 1/0214 |
| 2020/0264623 A1* | 8/2020 | Huai | B60W 50/08 |
| 2020/0353943 A1* | 11/2020 | Siddiqui | G08G 1/012 |
| 2020/0374345 A1* | 11/2020 | Yerli | H04L 67/12 |
| 2020/0377111 A1* | 12/2020 | Misu | B60W 50/06 |
| 2020/0406906 A1* | 12/2020 | Omari | G05D 1/0221 |
| 2021/0094577 A1* | 4/2021 | Shalev-Shwartz | B60W 30/0953 |
| 2021/0104171 A1* | 4/2021 | White | G06N 3/084 |
| 2021/0107494 A1* | 4/2021 | Silver | B60W 60/0015 |
| 2021/0174245 A1* | 6/2021 | Lewis | G06Q 50/30 |
| 2021/0229680 A1* | 7/2021 | Chakravarty | G06N 3/084 |
| 2021/0309251 A1* | 10/2021 | Vithaldas | G06F 11/3466 |
| 2021/0326312 A1* | 10/2021 | White | G06F 16/9535 |
| 2021/0339772 A1* | 11/2021 | Ramamoorthy | G06N 3/08 |
| 2022/0204020 A1* | 6/2022 | Misu | G06F 30/27 |
| 2023/0004164 A1* | 1/2023 | Onofrio | G05D 1/0214 |
| 2023/0004801 A1* | 1/2023 | Farabet | G06N 3/08 |

OTHER PUBLICATIONS

Li, et al., "Reinforcement Learning and Deep Learning based Lateral Control for Autonomous Drivin", Oct. 30, 2018, 14 pages.
Mertens, "Generating Data to Train a Deep Neural Network End-To-End within a Simulated Environment", Oct. 10, 2018, 48 pages.
Zhu, et al., "Vision-based control in the open racing car simulator with deep and reinforcement learning", Sep. 18, 2019, 13 pages.
"Foreign Office Action", EP Application No. 20189455.7, dated May 15, 2023, 7 pages.

* cited by examiner

METHOD AND SYSTEM OF COLLECTING TRAINING DATA SUITABLE FOR TRAINING AN AUTONOMOUS DRIVING SYSTEM OF A VEHICLE

CROSS-REFERENCE TO RELATED APPLICATION

This application claims priority to European Patent Application Number 20189455.7, filed Aug. 4, 2020, the disclosure of which is hereby incorporated by reference in its entirety herein.

BACKGROUND

The present disclosure relates to the field of vehicle autonomous driving, and more precisely to a method and a system for training a planning module, typically a motion planning module, for vehicle autonomous driving.

An autonomous driving system can be described by three levels.

The first level relates to the perception. The vehicle is sensing its environment with multiple sensors like cameras, radars and lidars. It can receive additional inputs, for example from the high-definition maps.

Based on the perception information, at a second level, a motion planning module plans a trajectory for the vehicle. This motion planning module comprises sub-modules including a behavior planning module and a trajectory planning module.

The behavior planning module uses algorithms that receive inputs from the perception level and determines high-level decisions for the vehicle, like "change lane to the left/right", "follow lane with a given speed", "adjust lane bias to given value", "accelerate", or other decision. This behavior planning intends to give a high-level description of how the vehicle is planned to drive.

Instead of the behavior planning module, a tactical or maneuver planning module can be used to give more detailed outputs with additional information, for example: follow lane with a current speed, follow lane with a given speed equal to the current speed increased or decreased by a given speed delta (e.g. 2 m/s), follow lane with a speed equal to a given value (e.g. 32 m/s), follow lane with a given lane bias adjustment (e.g. 0.5 m), change lane to the left with multiple variants like the current speed, a speed change, an acceleration change, a final lane bias, etc.

The trajectory planning module uses algorithms that take the high-level decisions provided by the behavior planning module (or by the tactical or the maneuver planning module) and outputs low-level control signals for the vehicle. The vehicle does not understand the high-level decisions that need to be translated into executable steering instructions. This module generates doable trajectories for the vehicle.

Finally, the autonomous driving system comprises a third level including a control module having the function of controlling the vehicle to keep it on the planned trajectory.

In other words, behavior planning (or tactical planning or maneuver planning) inside the autonomous driving system is responsible for providing high-level tactical decisions, which the autonomous vehicle should eventually take to reach a desired destination in the most efficient way. These high-level decisions are then used by trajectory planning algorithms to generate a safe and doable trajectory for the vehicle and, ultimately, the generated trajectory is executed by a control module of the vehicle.

In order to develop or train the behavior planning module, it is known to use a reinforcement learning method. For that purpose, an agent (vehicle) is put in an environment, for example in a simulation tool. At the beginning, the agent does not know anything about the environment and does not understand the concepts of lane change, speed change, or other concepts. It is allowed to perform an exploration inside the simulation by taking specific actions in an environment in order to maximize a cumulative reward. The agent is continuously trying combinations of different actions until it finds a meaningful policy on how to steer this agent in order to achieve a desired goal, for example to travel while still keeping at the speed limit. However, such a training method of the behavior planning algorithms, based on a simulation tool, may lead to a behavior planning module that is not satisfying because it generates behaviors of the vehicle that are not human-like behaviors and consequently may result in dangerous situations on the road.

In order to improve this drawback, it is known to train the behavior planning by imitation learning. Such a method can combine the reinforcement learning based on training an agent solely in a simulation and a supervised learning. It uses a set of labeled training data. However, this technique has the drawback that it requires to collect a large amount of training data from a large scale fleet of testing vehicles.

There is a need to improve the situation. More precisely, there is a need to provide a method for collecting training data suitable for training a vehicle autonomous driving system in a more human-like manner without requiring important training efforts.

SUMMARY

The present disclosure concerns a method of collecting training data suitable for training an autonomous driving system of a vehicle, comprising the steps of: providing a scenario database storing predefined road scenarios, providing user devices with a simulation game for controlling a vehicle agent in a road scenario, at each of a plurality of user devices, running the simulation game, playing a road scenario from the scenario database on a display of the user's device, controlling the vehicle agent in the simulation with steering actions entered by the user, and generating a human demonstration of the played road scenario. The steps further include collecting, as training data, a plurality of human demonstrations of the stored road scenarios played on the plurality of user devices and storing them in a demonstration database.

The use of the imitation game by a plurality of user devices to create human demonstrations of predefined road scenarios allows to easily obtain a large amount of training data suitable to train a planning module of an autonomous driving system of a vehicle, for example by using an imitation learning algorithm or method. Such a method for collecting training data does not require factual vehicle tests for experimenting the road scenarios, that are difficult to achieve, expensive and time consuming, and allows to obtain a massive amount of training data and handle a broad range of road scenarios. It can be easily deployed to a large number of users.

Advantageously, a distribution server selects the road scenarios to be distributed to the user devices.

The method can comprise a step of anonymizing the human demonstrations before transmitting them to the demonstration database.

Each human demonstration of a road scenario generated by a user device can comprise successive samples that each include data indicating a current state on the road in the simulation and, if applicable, data indicating a steering action entered by the user that is currently being operated.

The road scenario can comprise a goal for the vehicle agent, and the human demonstration of the played road scenario can be completed either when the vehicle agent has reached this goal, or when the vehicle agent has missed this goal.

When the road scenario is played by the simulation game, predetermined steering actions to control the vehicle agent can be proposed to the user. These predetermined steering actions can depend on the road scenario presented to the user. They can also be actions that are the responsibility of a planning module to be trained. In this way, the collected training data are more relevant for training this planning module.

The simulation game can have a reward function and calculate a reward information depending on the actions entered by the user. The reward information can be included in the human demonstration of the road scenario that is transmitted to the demonstration database.

The present disclosure also concerns a method of training a planning module for an autonomous driving system of a vehicle, comprising the steps of creating a demonstration database by collecting training data by the method previously defined, and training the planning module by using the human demonstrations stored in the demonstration database.

The planning module can be trained by executing an imitation learning method and using the demonstration database.

The step of training can comprise training at least one of a behavior planning module and a trajectory planning module of a motion planning module for an autonomous driving vehicle.

The present disclosure can also concern a method of producing an autonomous driving vehicle, comprising the steps of training a reference planning module for an autonomous driving system of a vehicle by executing the training method above defined, configuring a planning module to be consistent with the trained reference planning module, providing the autonomous driving vehicle with the configured planning module.

The present disclosure also concerns a system for collecting training data suitable for training a vehicle autonomous driving system, comprising a scenario database storing a plurality of predefined road scenarios, a demonstration database, a plurality of user devices that each runs the simulation game, plays a road scenario from the scenario database on a display, controls a vehicle agent in the simulation with steering actions entered by the user, and generates a human demonstration of the played road scenario, and a collection server that collects, as training data, a plurality of human demonstrations of the stored road scenarios played on the plurality of user devices and storing them in a demonstration database.

The simulation game can be arranged to propose predefined actions to the user to control the vehicle agent, when a road scenario is played, said predefined actions being actions that are the responsibility of the planning module to be trained in autonomous driving.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
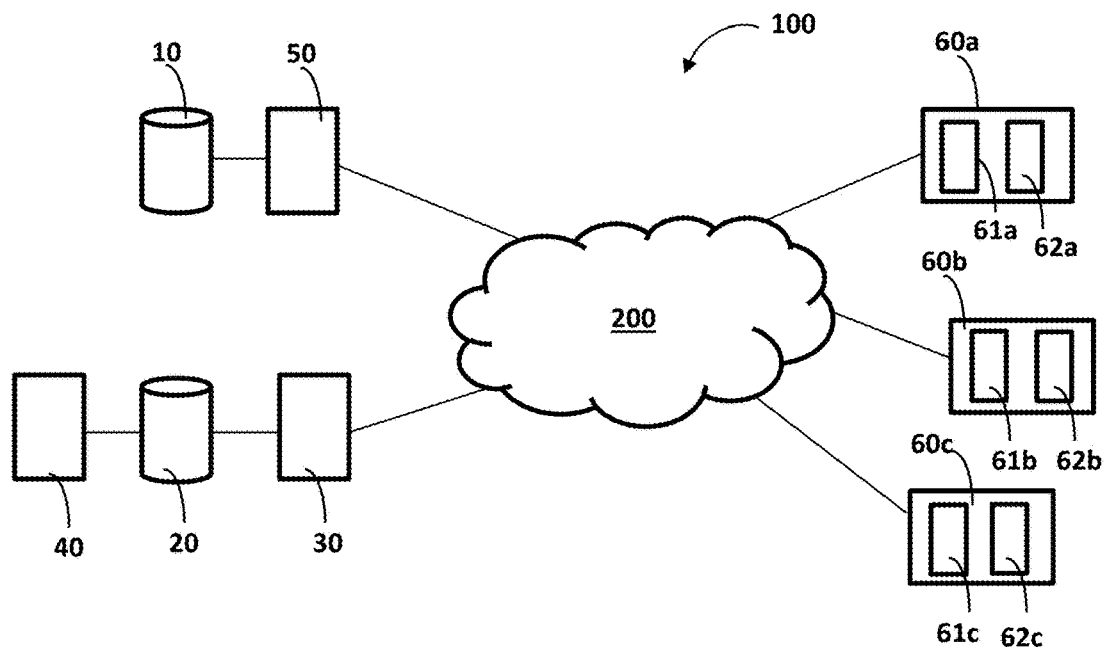
FIG. 1 shows a distributed system for training a planning module of vehicle autonomous driving, according to a particular embodiment.

FIG. 1 shows a system 100 for training a planning module for vehicle autonomous driving, according to a specific embodiment.

In this embodiment, the system 100 comprises a scenario database 10, a demonstration database 20, a collection server 30, a training server 40 and a plurality of user devices 60. The collection server 30 and the training server 40 each have access to the demonstration database 20. The two servers 30, 40, the scenario database 10 and the user devices 60 are all connected to a communication network 200.

The scenario database 10 stores a plurality of predefined road scenarios to be presented to the user's devices 60, for example by downloading or by streaming. A distribution server 50 can be in charge of distributing the road scenarios from the database 10 to the user devices 60. A road scenario corresponds to a situation that takes place on a road and can include a specific goal for a vehicle (called "agent") controllable by a user. Different types of goal can be defined. A first type of goal can be a lane-based goal, for example to be on a given lane in a given distance. A second type of goal can be related to the use of the speed limit, for example to travel with the highest possible speed. A third type of goal can be related to the traffic flow smoothness, for example to optimize some scene-based criterium like the average speed of all the vehicles on the road. A fourth type of goal can be related to the passenger's comfort, for example to minimize the vehicle's acceleration and jerk. Other types of goal could be defined.

Each user has a simulation game application 61 installed in his user device 60. The user device 60 has a display device 62 and is configured to run the simulation game and play a road scenario from the scenario database 10 on the display device 62. In the simulation game 61, the user can control an agent (a vehicle) in the road scenario that is being presented and played, by entering steering actions that are operated in the simulation. The simulation game application 61 has the additional function of generating a human demonstration of the road scenario that is being played in the simulation. A human demonstration is a set of data that describes how the road scenario does under control of the steering actions entered by the user in the simulation. It can comprise a sequence of samples taken with a predefined frequency (at successive time points), for example 10 samples per second. Each sample includes current information of the simulation, describing the current situation in the road scenario that is being played in the simulation. This current information can include data indicating a current state of the road defined by various pieces of information like the number of lanes, the number of vehicles (other than the vehicle agent), respective positions, speeds and accelerations of the vehicles in the scenario, or other information. It can also include data indicating a steering action entered by the user that is currently being executed in the simulation. The user device 60 can be a smartphone, a tablet, a computer or any other device or terminal.

The demonstration database 20 stores the human demonstrations of the predefined road scenarios stored in the scenario database 10 and that have been presented to and played by user devices 60.

The collection server 30 has the function of collecting these human demonstrations from the user devices 60 and storing the collected human demonstrations into the demonstration database 20.

The training server 40 is for training a planning module of an autonomous driving system for a vehicle.

As previously explained, an autonomous driving system of a vehicle, for example a car, has three levels: a perception level sensing the vehicle's environment with multiple sensors like cameras, radars and lidars, and receiving additional inputs like data from high-definition maps, a motion planning level that plans the trajectory of the vehicle, and a control level that controls the vehicle to follow the planned trajectory.

The data stored in the demonstration database 20 are used by the training server 40 to train algorithm(s) of the motion planning level.

The motion planning level can have two modules. A first module can be a behavior planning module and a second module can be a trajectory planning module. Alternatively, the first module can be a tactical or maneuver planning module.

Schematically, the behavior planning module is responsible for providing high-level driving decisions (e.g. "follow lane", "change to left/right lane" or "accelerate" or "slow down", . . . ) based on the inputs provided by the perception level (typically sensor data and map data). When a tactical or maneuver planning module is used instead of the behavior planning module, the high-level driving decisions include additional information that defines more precisely how to drive the vehicle (e.g. "follow lane with current speed (or acceleration)", "follow lane with the current speed (or acceleration) increased or decreased by a given speed (acceleration) delta", "follow the lane with a given lane bias adjustment", "change lane to the left with multiple variants like current speed, a speed (or acceleration) change, a final lane bias, other additional driving information", "abort the current maneuver", "emergency braking maneuver", "emergency braking maneuver with the escape lane change to the right", other additional driving information).

The trajectory planning module takes the high-level decisions as inputs and is responsible for outputting low level signals for controlling the vehicle so as to generate an executable trajectory. In other words, the trajectory planning module translates the high-level decisions from the behavior (or tactical or maneuver) planning module into executable steering instructions and thus generates a doable trajectory for the vehicle.

The respective responsibilities of the first module and second module (i.e., the behavior (or tactical or maneuver) planning module and the trajectory planning module) can vary. But, from a global point of view, the motion planning module receives inputs from the perception level and outputs steering instructions to control the vehicle so that the latter follows a planned trajectory.

In the present embodiment, the training server 40 has the function of training the behavior (or tactical or maneuver) planning module. The training can be executed by an imitation learning algorithm or method and use the human demonstration data stored in the demonstration database 20 as training data.

The method of collecting training data suitable for training an autonomous driving system of a vehicle will now be described with reference to FIGS. 2 and 3.

The method comprises a step S0 of providing a scenario database 10 storing a plurality of predefined road scenarios and a step S1 of providing each of a plurality of users with a simulation game application 61 for controlling a vehicle agent in a road scenario, the user having a device 60 configured to run the simulation game application 61 installed therein.

In a step S2, a user device 60 runs the simulation game application 61. The simulation game application 61 connects to the scenario database 10 with the user device 60 to receive a predefined road scenario stored therein, for example by download or streaming, in a step S3.

The road scenario presented to the user device 60 can be selected among the plurality of predefined road scenarios stored in the database, either by the user or, advantageously, by the distribution server 50 in charge of distributing the road scenarios to users. The distribution of the predefined road scenarios from the database 10 to the plurality of users 60 should be done so as to collect a massive amount of training data related to a broad range of road scenarios played by a large number of user devices. For example, the distribution server 50 distributes each predefined road scenario of the scenario datable 10 to a number of user devices that is equal or more than a predetermined threshold.

Figure 2:
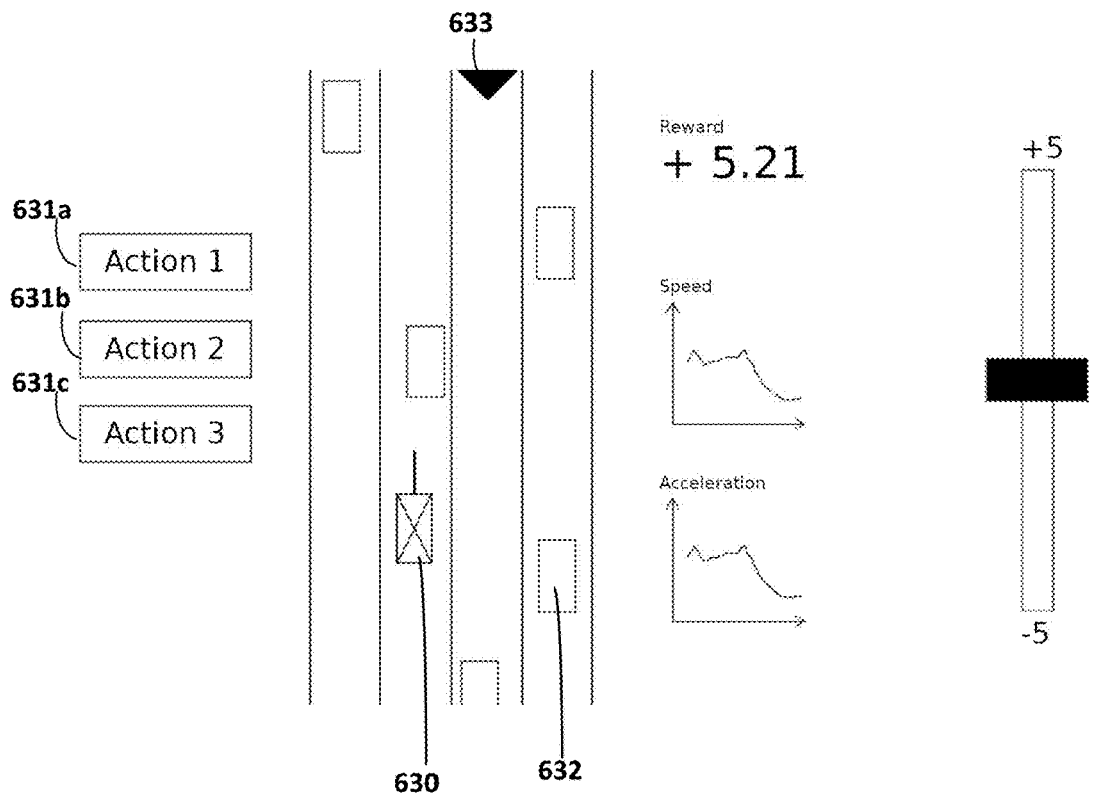
FIG. 2 shows an example of a road scenario run by a simulation game and displayed by a user device.
Figure 3:
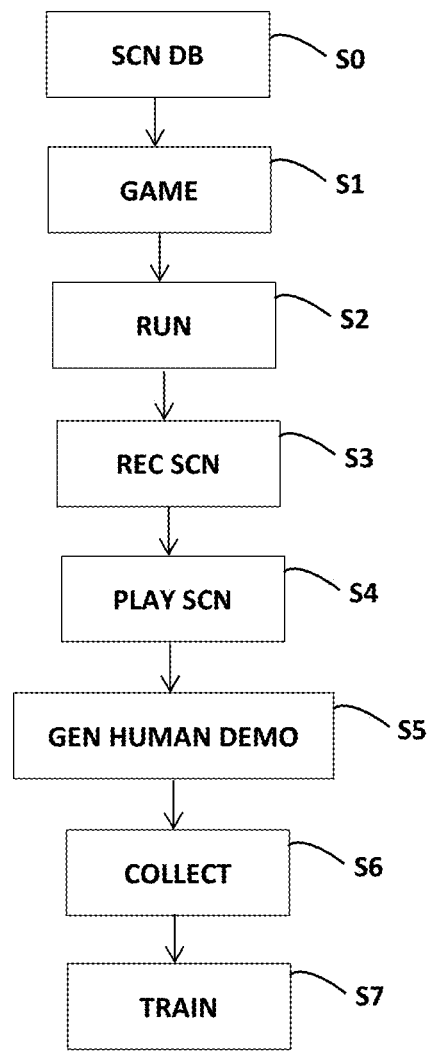
FIG. 3 shows a flowchart of a method for training a planning module of vehicle autonomous driving, according to an embodiment.

In a step S4, the simulation game application 61 runs on the user device 60 and plays the received road scenario 63 that is displayed on the display device 62, as represented in FIG. 2. The road scenario 63 defines an agent 630 (a vehicle), controllable by the user, lanes, one or more other vehicles 632 having given positions, speeds and accelerations, and a given goal. In the example road scenario represented in FIG. 2, the vehicle agent 630 travels on a highway having four lanes. Other vehicles 632 travel on the lanes and the goal is to reach a given position 633 indicated by an arrow on the top of the second lane from the right.

In the step S4, the user controls the agent 630 (vehicle) by entering steering actions that are operated in the simulation. A user interface can allow the user to enter predetermined steering actions. For example, it includes a plurality of action buttons displayed on the display device 62, such as the buttons 631*a* to 631*c* in FIG. 2. For example, the buttons 631*a* to 631*c* can correspond to the following steering actions: follow lane, change lane to the right and change lane to the left. The user interface may also have a slider 634 to adjust a property of the vehicle, typically a property that can be defined by a continuous (real) value. For example, the user can increase or decrease the current velocity set point, i.e. the desired velocity, by a value that can be selected between −5 km/h to +5 km/h, using the slider 634. The slider 634 can be used to set a value for any other control signal or property of the vehicle, e.g. the values for acceleration or lane bias. The predetermined steering actions proposed to the user can be adapted to the specific road scenario presented and thus vary depending on the road scenarios. Furthermore, these predetermined actions can correspond to high-level decisions that are the responsibility of the planning module (e.g. the behavior planning module) to be trained.

The steering actions of the user could be entered by any other means of user interface. This could be voice commands or tactile commands.

When the road scenario is being played and the user controls the vehicle agent 630 by entering one or more steering actions, the simulation game application 61 generates a human demonstration of the played road scenario, in a step S5. For that purpose, at successive sampling time points, the user device 60 saves current information of the simulation. For each time point, the current information can include data describing the current state of the simulation (number of lanes, number of vehicles, position, speed, acceleration of each vehicle . . . ) and, if applicable, a current steering action entered by the user that is being operated in the simulation. The samples can be created and saved with a predetermined frequency. For example, ten samples are created per second. The sequence of successive samples forms the human demonstration of the played road scenario.

The road scenario played by the user device 60 is completed when the vehicle agent 630 has reached the goal 633 or has missed it. The complete human demonstration is saved by the user device 60.

In a step S6, the collection server 30 collects the (complete) human demonstration of the road scenario presented to the user device 60 and stores it into the demonstration database 20.

The steps S2 to S6 are executed by a plurality of users and for a plurality of different road scenarios, in order to collect, as training data, a plurality of human demonstrations of a plurality of predefined road scenarios. Advantageously, all the predefined road scenarios stored in the scenario database 10 are each presented to different users (for example at least to a minimum number of users), in order to produce a demonstration database containing a sufficient quantity of human demonstrations (training data) from different users for each of the stored road scenarios.

The present disclosure also concerns a method of training a motion planning module designed for an autonomous driving vehicle, including the steps of populating a demonstration database by collecting training data as previously described with reference to FIG. 3, and training the motion planning module by using the human demonstrations stored in the demonstration database 20.

Thus, the demonstration database 20 can be used to train the algorithm(s) of a motion planning module designed for an autonomous driving vehicle, for example a behavior planning module, in a training step S7. More precisely, the planning module can be trained with an imitation learning method and using the demonstration database 20.

The demonstration database 20 could be used to train algorithm(s) of the trajectory planning module of the motion planning module, or other algorithms like those used in a simulation game or tool for driving a vehicle.

In a first variant, the application game application includes an anonymization function that anonymizes the human demonstrations before transmitting them to the demonstration database 20. However, additional contextual data can be collected together with the human demonstrations, such as a geographical information identifying for example a geographical region of the user. This allows to learn robust driving policy capable of working in different regions. Indeed, data is collected from drivers from different world regions. The driving policy can thus be trained on diversified datasets and will therefore behave more robustly.

In a second variant, the application game application includes a reward function that can calculate a reward information depending on the steering actions entered by the user in the simulation of a road scenario. The reward information can be a numerical value. It can be displayed on the display device 62 during the simulation, as shown in FIG. 2. It depends on the quality of the user's actions. The reward information can be determined based on multiple factors like speed, comfort, number of actions taken by the user, compliance with the traffic rules, compliance with general safety rules, general traffic flow smoothness.

Optionally, the simulation game application 61 can display on the display device 62 various data (or metrics) describing the current state of the vehicle in the simulation (e.g. position, speed, acceleration, jerk, etc.), as shown in FIG. 2.

Optionally, the distribution server 50 and the collection server 30 can be fused. The training server 40 can also be fused with the collection server 30 and/or the distribution server 50.

The training using the demonstration database can be performed on a reference planning module (e.g. a behavior planning module). Then, this reference planning module is duplicated to be installed in a fleet of vehicles. In other words, the reference planning module are produced or configured to be consistent with the reference planning module.

The present disclosure also concerns a method of producing an autonomous driving vehicle, comprising the steps of training a reference planning module designed for an autonomous driving vehicle by executing the training method previously described, configuring a planning module to be consistent with the trained reference planning module, and providing the autonomous driving vehicle with the configured planning module

What is claimed is:

1. A method, comprising:
 collecting training data to train an autonomous driving system of a vehicle, collecting the training data comprising:
  providing a scenario database storing predefined road scenarios;
  providing user devices with a simulation game for controlling a vehicle agent in a road scenario, the road scenario being selected and distributed to the user devices by a distribution server;
  at multiple pluralities of user devices, each plurality of user devices corresponding to a respective predefined road scenario stored in the scenario database and a number of user devices in each plurality of user devices exceeding a threshold:
   running the simulation game;
   playing the respective predefined road scenario from the scenario database on a display of each of the multiple pluralities of user devices;
   controlling the vehicle agent in the simulation game with steering actions entered by a user of a respective user device; and
   generating a human demonstration of the played road scenario, the human demonstration being a set of data that describes how the predefined road scenario reacts under control of the steering actions entered by the user;
  collecting, as the training data, a plurality of human demonstrations of the stored predefined road scenarios played on each plurality of user devices;
  storing, by at least one processor, the training data in a demonstration database that is accessible to the vehicle for training the autonomous driving system to handle controlling the vehicle in a driving situation related to at least one simulated road scenario from the scenario database;
 training the autonomous driving system based on the stored training data; and
 controlling the vehicle based on the trained autonomous driving system.

2. The method of claim 1, wherein collecting the training data further comprises anonymizing the human demonstrations before transmitting them to the demonstration database.

3. The method of claim 1, wherein each respective human demonstration of the road scenario generated by the user device comprises a sequence of successive samples that each include data indicating a current state on a road in the simulation game.

4. The method of claim 3, wherein each respective human demonstration of the road scenario generated by the user device further comprises applicable data indicating a steering action entered by the user in operating the user device.

5. The method of claim 1, wherein, the road scenario comprising a goal for the vehicle agent, the human demonstration of the played road scenario is completed either when the vehicle agent has reached the goal, or when the vehicle agent has missed the goal.

6. The method of claim 1, wherein, when the road scenario is played by the simulation game, predetermined steering actions to control the vehicle agent are proposed to the user, and said predetermined steering actions are actions that depend on said road scenario.

7. The method of claim 6, wherein said predetermined steering actions are actions that are a responsibility of a planning module to be trained.

8. The method of claim 1, wherein, the simulation game calculates a reward information depending on the steering actions entered by the user.

9. The method of claim 8, wherein the reward information is included in the human demonstration of the road scenario that is transmitted to the demonstration database.

10. A method, comprising:
training a planning module of a vehicle to enable autonomous driving, the training comprising:
populating a demonstration database by collecting training data by:
providing a scenario database storing predefined road scenarios;
providing user devices with a simulation game for controlling a vehicle agent in a road scenario, the road scenario being selected and distributed to the user devices by a distribution server;
at multiple pluralities of user devices, each plurality of user devices corresponding to a respective predefined road scenario stored in the scenario database and a number of user devices in each plurality of user devices exceeding a threshold:
running the simulation game;
playing the respective road scenario from the scenario database on a display of each respective user device of the multiple pluralities of user devices;
controlling the vehicle agent in the simulation game with steering actions entered by a user of each respective user device;
and generating a human demonstration of the played road scenario, the human demonstration being a set of data that describes how the respective predefined road scenario reacts under control of the steering actions entered by the respective user;
collecting, as the training data, a plurality of human demonstrations of the stored predefined road scenarios played on each plurality of user devices;
storing, by at least one processor, the training data in a demonstration database that is accessible to the vehicle for training an autonomous driving system to handle controlling the vehicle in a driving situation related to at least one simulated road scenario from the scenario database;
training, based on the human demonstrations stored in the demonstration database, the planning module; and
enabling, by the trained planning module, the vehicle to drive autonomously.

11. The method of claim 10, wherein training the planning module further comprises executing an imitation learning process to generate the training data stored in the demonstration database.

12. The method of claim 10, wherein training the planning module further comprises training at least one of a behavior planning module of the vehicle or a trajectory planning module of a motion planning module of the vehicle.

13. The method of claim 10, further comprising:
producing an autonomous driving vehicle by:
training, based on the training data in the demonstration database, a reference planning module of the autonomous driving vehicle to enable autonomous driving; and
configuring the planning module of the autonomous driving vehicle to be consistent with the trained reference planning module; and
providing the autonomous driving vehicle with the configured planning module.

14. A system, comprising:
a scenario database configured to store a plurality of predefined road scenarios;
multiple pluralities of user devices, each plurality of user devices corresponding to a respective predefined road scenario stored in the scenario database and a number of user devices in each plurality of user devices exceeding a threshold, each configured to run a simulation game to play a road scenario from the scenario database on a display by controlling a vehicle agent in the simulation game with steering actions entered by a respective user from which a human demonstration of the played road scenario;
a distribution database configured to select the respective road scenario from the scenario database and distribute each road scenario to each respective plurality of user devices;
a demonstration database configured to store collected training data to train an autonomous driving system of a vehicle, the demonstration database accessible to the vehicle for training the autonomous driving system to handle controlling the vehicle in a respective driving situation related to each of the plurality of predefined road scenarios from the scenario database; and
a collection server configured to:
collect a plurality of human demonstrations of the stored plurality of predefined road scenarios played on each plurality of user devices, the plurality of human demonstrations being a set of data that describes how the predefined road scenario reacts under control of the steering actions entered by the user; and
cause, the demonstration database, to store the plurality of human demonstrations as the training data; and
the demonstration database being further configured to output a portion of the collected training data related to at least one simulated road scenario from the scenario database to train an autonomous driving system of a vehicle to handle a driving situation related to the at least one simulated road scenario.

15. The system according to claim 14, wherein the simulation game proposes predefined actions to each respective user to control the vehicle agent when the road scenario is played, the predefined actions being actions that are a responsibility of the autonomous driving system that is to be trained.

16. The system of claim 14, wherein the collection server is configured to collect the training data by anonymizing the plurality of human demonstrations before transmitting the plurality of human demonstrations to the demonstration database.

17. The system of claim 14, wherein the road scenario comprises a goal for the vehicle agent, the human demonstration of the played road scenario is completed either when the vehicle agent has reached the goal, or when the vehicle agent has missed the goal.

18. The system of claim 14, wherein the simulation game calculates a reward information depending on the steering actions entered by the user.

19. The system of claim 14, wherein each respective human demonstration of the road scenario generated by the user device comprises a sequence of successive samples that each include data indicating a current state on the road in the simulation game.

20. The system of claim 19, wherein each respective human demonstration of the road scenario generated by the user device further comprises applicable data indicating a steering action entered by the user in operating the user device.

* * * * *